US011937201B2

(12) United States Patent
Sridharan et al.

(10) Patent No.: US 11,937,201 B2
(45) Date of Patent: Mar. 19, 2024

(54) METHODS TO IMPROVE AND OPTIMIZE DE-REGISTRATION PROCEDURES WITH ACCESS AND MOBILITY MANAGEMENT FUNCTION (AMF)

(71) Applicant: T-Mobile USA, Inc., Bellevue, WA (US)

(72) Inventors: Srinivasan Sridharan, Bellevue, WA (US); Subramania Kaushik, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 407 days.

(21) Appl. No.: 17/132,317

(22) Filed: Dec. 23, 2020

(65) Prior Publication Data
US 2022/0201642 A1 Jun. 23, 2022

(51) Int. Cl.
*H04W 60/06* (2009.01)

(52) U.S. Cl.
CPC .................. *H04W 60/06* (2013.01)

(58) Field of Classification Search
None
See application file for complete search history.

(56) References Cited

U.S. PATENT DOCUMENTS

| | | | | |
|---|---|---|---|---|
| 2011/0022729 A1* | 1/2011 | Eisenhauer | ............. | H04L 43/50 709/242 |
| 2022/0400460 A1* | 12/2022 | Li | ........................ | H04W 60/04 |
| 2023/0122389 A1* | 4/2023 | Gupta | ................... | H04W 12/60 455/411 |

* cited by examiner

*Primary Examiner* — Suhail Khan (74) *Attorney, Agent, or Firm* — Lee & Hayes P.C.

(57) ABSTRACT

A system having a processor configured for executing computer-executable instructions for deregistering a user equipment (UE) during a transition between a first mobile domain and a second mobile domain. A data store is paired with the processor being configured for storing UE data, the UE data comprising one or more of the following: customer profile information, customer authentication information, and encryption keys for the information. A connection controller is configured for managing all connection and session related information from the UE. Upon detecting the UE is transitioned from the first mobile domain to the second mobile domain, the processor is configured to send a data packet to the connection controller to deregister the UE. Absent a confirmation message from the connection controller, the processor is configured to deregister the UE.

15 Claims, 11 Drawing Sheets

METHODS TO IMPROVE AND OPTIMIZE DE-REGISTRATION PROCEDURES WITH ACCESS AND MOBILITY MANAGEMENT FUNCTION (AMF)

TECHNICAL FIELD

Aspects of the embodiments of the invention generally relate to mobile network management. In particular, embodiments of the invention generally relate to mobile signal registration and deregistration.

BACKGROUND

When a subscriber's service is moving from a first mobile domain to a second mobile domain (e.g., a 4G mobile domain or network to a 5G mobile domain or network), a unified data management (UDM) is tasked to register the subscriber with the 5G mobile domain and de-registering the subscriber from the 4G mobile domain. However, existing process of de-registering may be incomplete where UDM's de-registration request to an Access and Mobility Management Function (AMF) is not responded or includes an error message. As a result, instead of disconnecting the subscriber from the first mobile domain completely, the UDM not only maintains the first mobile domain for the subscriber, but also create the registration on the second mobile domain. While this prevents unnecessary disconnections, this configuration creates unnecessary and wasteful signaling between first and second mobile domains.

Aspects of the invention attempt to address the shortcomings of the prior approaches.

SUMMARY

Aspects of the invention resolve existing practices' shortcomings by utilizing a "purge flag." The UDM, in one example, if it fails to receive a response or it receives a response indicating an error, may set the purge flag to be TRUE or remove all AMF related information. Once completed, the UDM may proceed to register the subscriber with the second mobile domain.

BRIEF DESCRIPTION OF THE DRAWINGS

Persons of ordinary skill in the art may appreciate that elements in the figures are illustrated for simplicity and clarity so not all connections and options have been shown. For example, common but well-understood elements that are useful or necessary in a commercially feasible embodiment may often not be depicted in order to facilitate a less obstructed view of these various embodiments of the present disclosure. It may be further appreciated that certain actions and/or steps may be described or depicted in a particular order of occurrence while those skilled in the art may understand that such specificity with respect to sequence is not actually required. It may also be understood that the terms and expressions used herein may be defined with respect to their corresponding respective areas of inquiry and study except where specific meanings have otherwise been set forth herein.

DETAILED DESCRIPTION

Embodiments may now be described more fully with reference to the accompanying drawings, which form a part hereof, and which show, by way of illustration, specific exemplary embodiments which may be practiced. These illustrations and exemplary embodiments may be presented with the understanding that the present disclosure is an exemplification of the principles of one or more embodiments and may not be intended to limit any one of the embodiments illustrated. Embodiments may be embodied in many different forms and should not be construed as limited to the embodiments set forth herein; rather, these embodiments are provided so that this disclosure may be thorough and complete, and may fully convey the scope of embodiments to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Figure 1:
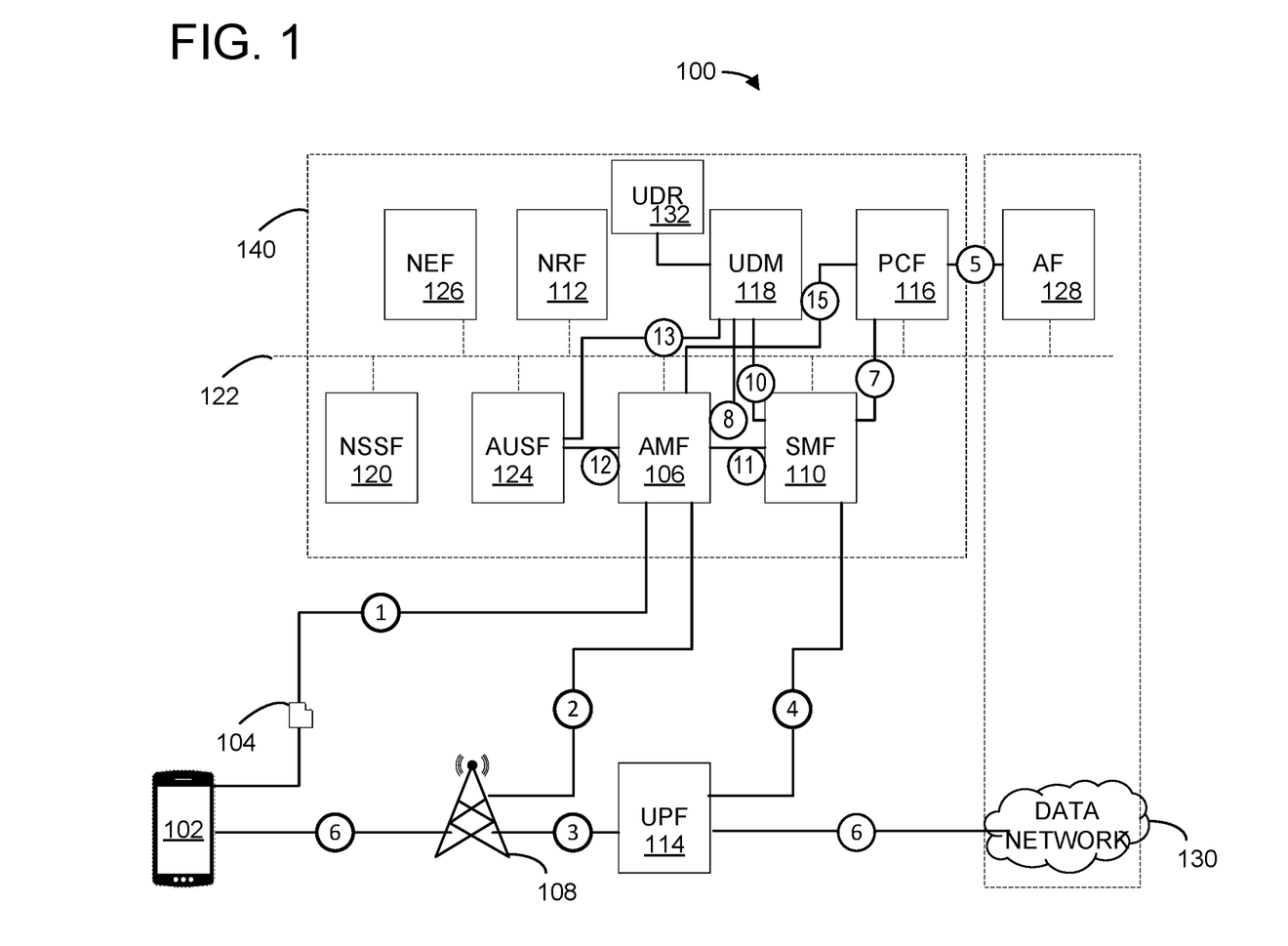
FIG. 1 illustrates a diagram illustrating a system for de-registration of a user device (UE) according to one embodiment.

To further illustrate aspects of the invention, FIG. 1 is a diagram illustrating an overview of a system 100 for de-registration of a user device (UE) according to one embodiment. For example, in a very brief overview, the system 100 may be a 5th Generation (5G) (or New Radio (NR)) network of the 3GPP Wireless Communication Standard, and/or may include elements of a 5G network in a standalone infrastructure. For example, a user equipment (UE) 102 may start or initiate a given session with a data packet or message 104 to be sent to an access and mobility management function (AMF) 106 via path 1. In one embodiment, a new base station (gNB or gNodeB) 108 may also initiate a request to the AMF 106 to begin the session.

Figure 10:
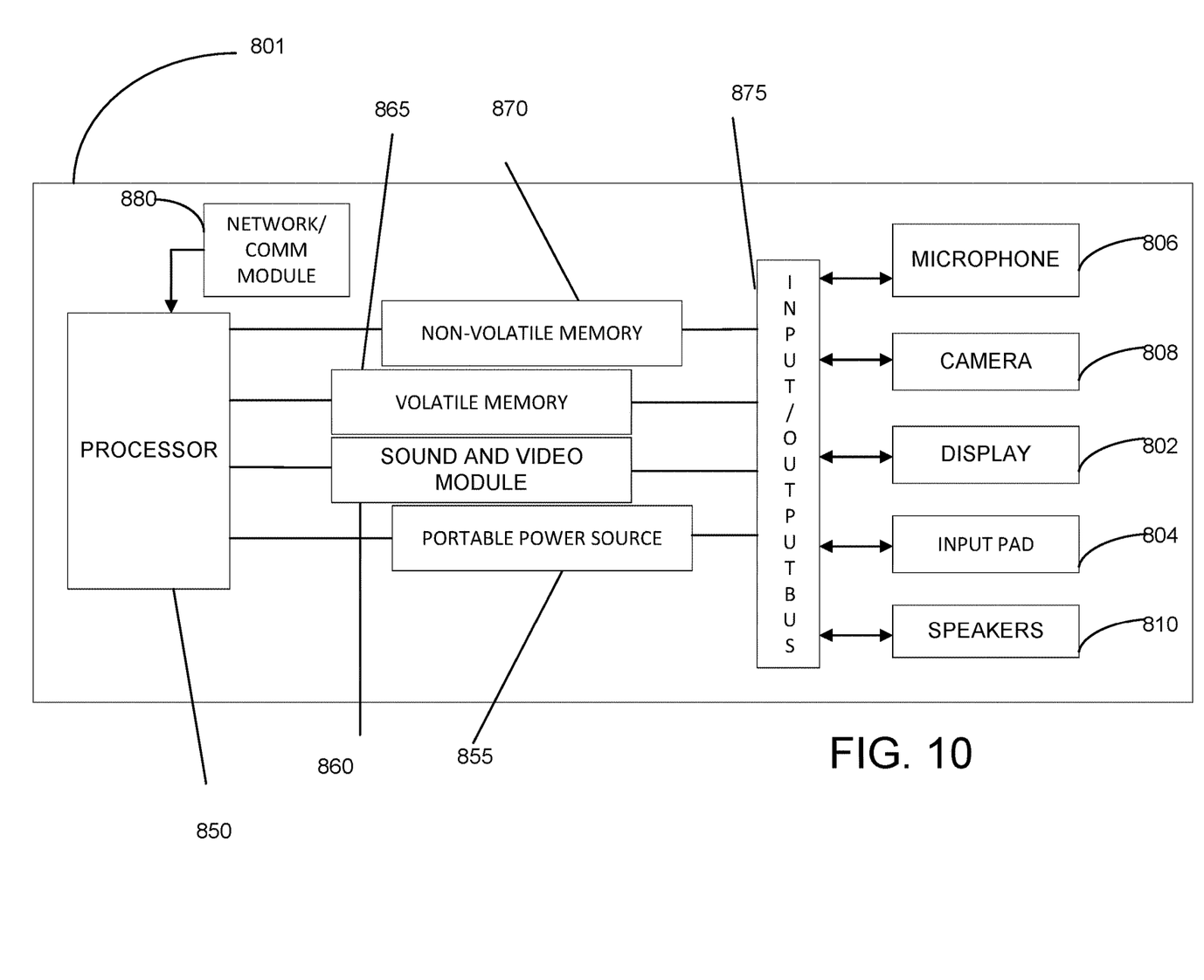
FIG. 10 is a diagram illustrating a portable computing device according to one embodiment.

In one example, the UE 102 may be a mobile device 801, which is further illustrated in FIG. 10. In one embodiment, the UE 102 may be a smartphone, a tablet, a smartwatch, etc. In another embodiment, the AMF 106 may receive these requests and handles anything to do with connection or mobility management. In one embodiment, the AMF 106 may not process session management types of messages. Rather, the AMF 106 may forward these messages to a session management function (SMF) 110 via path 11. In one embodiment, a network repository function (NRF) 112 may assist the AMF 106 regarding what kind of messages are forwarded. For example, the AMF 106 may at 204 determine which message may be best suited to handle the connection request by querying the NRF 112. The functional connection between the NRF 112 and the SMF 110 may be triggered so that the message may be forwarded.

For example, the NRF 112 may be configured to perform the functions of network functions (NF) that may provide service registration and discovery, enabling NFs to identify appropriate services in one another in the 5G infrastructure. In one example, messages received over the path 11 may represent a trigger to add, modify or delete a Protocol Data Unit (PDU) session across a user plane. The SMF 110 may send messages to a user plane function (UPF) 114 over a path 4 reference interface using a Packet Forwarding Control Protocol (PFCP).

To further focus on aspects of the invention, the SMF 110, during a session establishment or modification, may also interact with a Policy Control Function (PCF) 116 over an interface and a subscriber profile information stored within a Unified Data Management (UDM) 118 function via path 10, which may include a role previously performed by a hardware device, such as a home subscriber server (HSS) under the previous 4G infrastructure. In one embodiment, the UDM 118 may store data in or retrieve data from a Unified Data Repository (UDR) 132. In one example, the UDR 132 may store customer profile information, customer authentication information, and encryption keys for the information. In another embodiment, the UDR 132 may include connection and session related information of or from the UE 102. Employing a service base interface (SBI) message bus 122, the PCF 116 may provide the foundation of a policy framework which, along with the more typical QoS and charging rules, includes Network Slice selection, which is regulated by a Network Slice Selection Function (NSSF) 120.

Still referring to FIG. 1, the system 100 may further include an authentication server function (AUSF) 124, a network exposure function (NEF) 126, an application function (AF) 128, and a data network 130. As previously discussed, the 5G standalone infrastructure may fully exploit the service-based architecture (e.g., software based functions 140) so that these functions are performed via software implementations.

With FIG. 1's approach, aspects of the invention further enhance the capabilities of the UDM 118. In one example, as discussed, when the UE 102 is switching from one network (e.g., 4G) 204 to another network (e.g., 5G) 206, the UDM 118 may need to handle the communications between the networks so that the packets from the UE 102 between the networks may be transferred seamlessly. It is also understood that the network switching may occur from a variety of networks. For example, it may be between mobile communication networks (e.g., 4G to or from 5G). In another example, the switching may be from a WI-FI network to a mobile network or vice versa. In another embodiment, the switching may be going from one network provider to another provider. Therefore, it is to be understood that capabilities of aspects of the invention may not be limited by the types of the networks.

However, there are situations where the transfers may not occur smoothly so that a tremendous amount of overhead (e.g., hardware or network traffic overhead) or unnecessary network signaling or traffic may occur.

Figure 2:
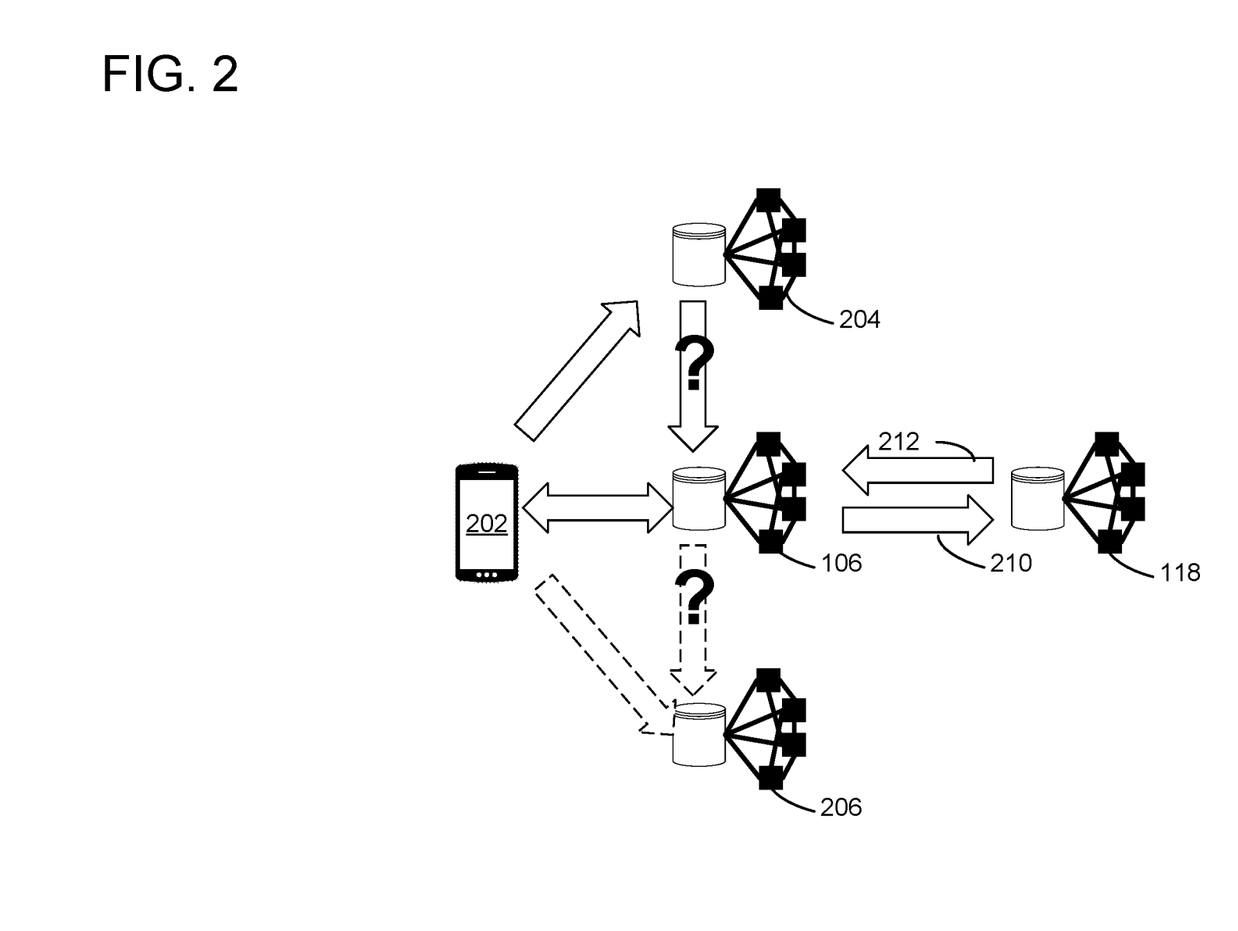
FIG. 2 illustrates a first example of an error where data packets are moving from a first network to a second network in response to a user equipment's movement or request according to some embodiments.

In one embodiment, FIG. 2 illustrates a first scenario. FIG. 2 illustrates a first example of an error where data packets are moving from a network 204 to a network 206 in response to a UE 202's movement or request. In another embodiment, the switching may be in response to a network control as well, such as due to network traffic loads or other reasons. In such an example, the AMF 106 may register the UE 202 or the UE 202 may be registered on the network 204 (e.g., 5G). As such, the AMF 106 may set a "De/Reg Call Back URI" as present or active.

In moving from the network 204 to the network 206, the UDM or UECM of the network 204 may send a deregistration 212 to the AMF 106 for any of the deregistration reasons. In one embodiment, there may be the following reasons:

DEREG_REASON A—UE_INITIAL_REGISTRATION
DEREG_REASON B—UE_REGISTRATION_AREA_CHANGE
DEREG_REASON C—SUBSCRIPTION-WITHDRAWAL
DEREG_REASON D—5GS_TO_EPS_MOBILITY
DEREG_REASON E—5GS_TO_EPS_MOBILITY_UE_INITIAL_REGISTRATION

It is to be understood that other reasons may be created or indicated without departing from the scope of aspects of the invention.

In another embodiment, the deregistration 212 may be sent to the AMF 106 of another network. For example, the first network 204 may belong to a first mobile carrier while the second network 206 may belong to a second mobile carrier. Therefore, to ensure the registration and/or deregistration is accomplished, the deregistration 212 may be needed.

In response to the information sent from the UDM or UECM, the AMF 106 may return an HTTP2 400 message 210, unfortunately.

Figure 3:
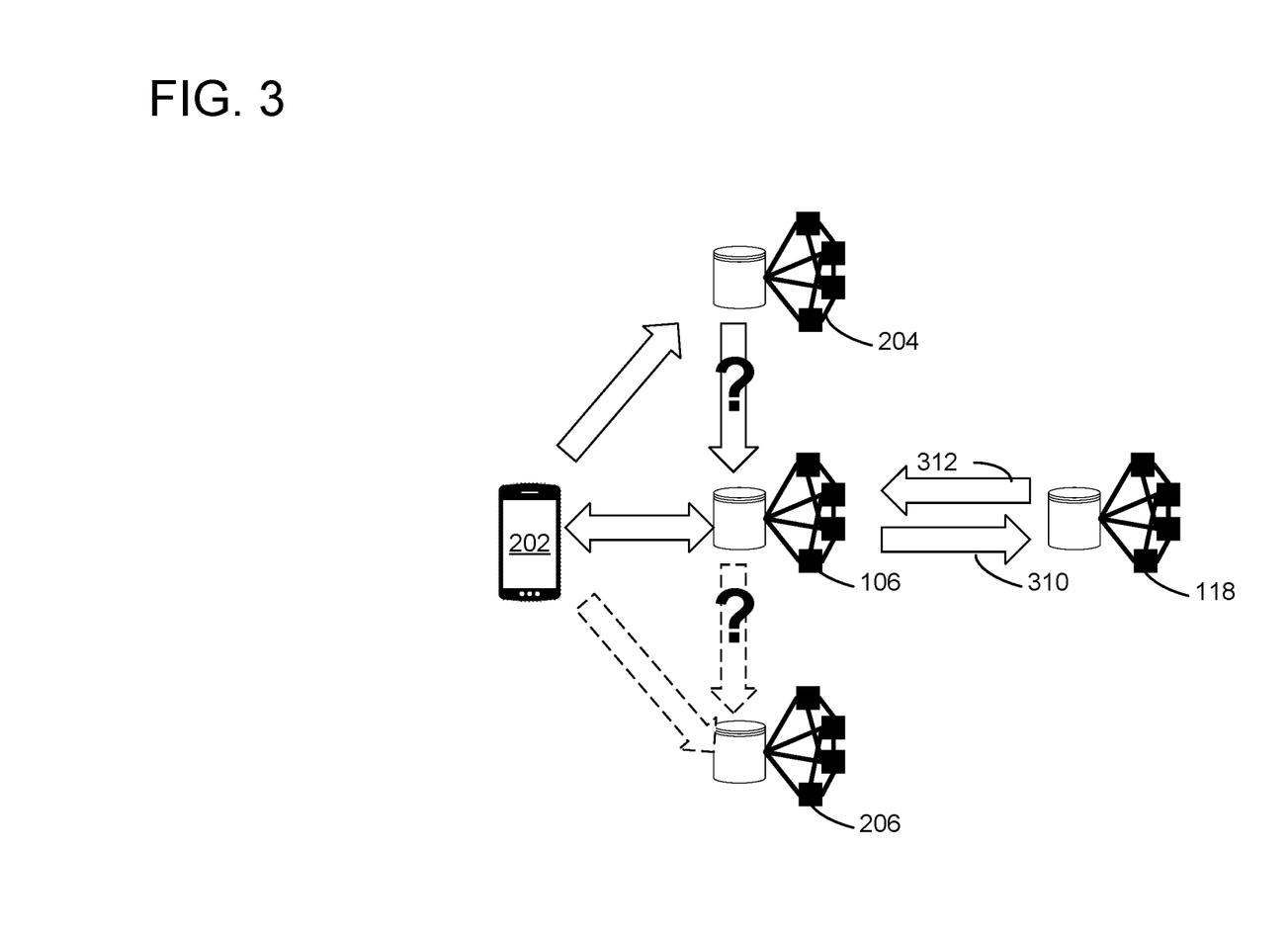
FIG. 3 illustrates a second example of an error where data packets are moving from a first network to a second network in response to a user equipment's movement or request according to some embodiments.

In a second scenario, FIG. 3 illustrates a second example of an error where data packets are moving from a network 204 to a network 206 in response to a UE 202's movement or request. In another embodiment, the switching may be in response to a network control as well, such as due to network traffic loads or other reasons. In such an example, the AMF 106 may register the UE 202 or the UE 202 may be registered on the network 204 (e.g., 5G). As such, the AMF 106 may set a "De/Reg Call Back URI" as present or active.

In moving from the network 204 to the network 206, the UDM or UECM of the network 204 may send a deregistration 312 to the AMF 106 for any of the deregistration reasons. In one embodiment, the deregistration may be communicated for the reasons above. It is to be understood that other reasons may be created or indicated without departing from the scope of aspects of the invention.

In response to the information sent from the UDM or UECM, the AMF 106 may return an HTTP2 404 message 310, unfortunately.

Figure 4:
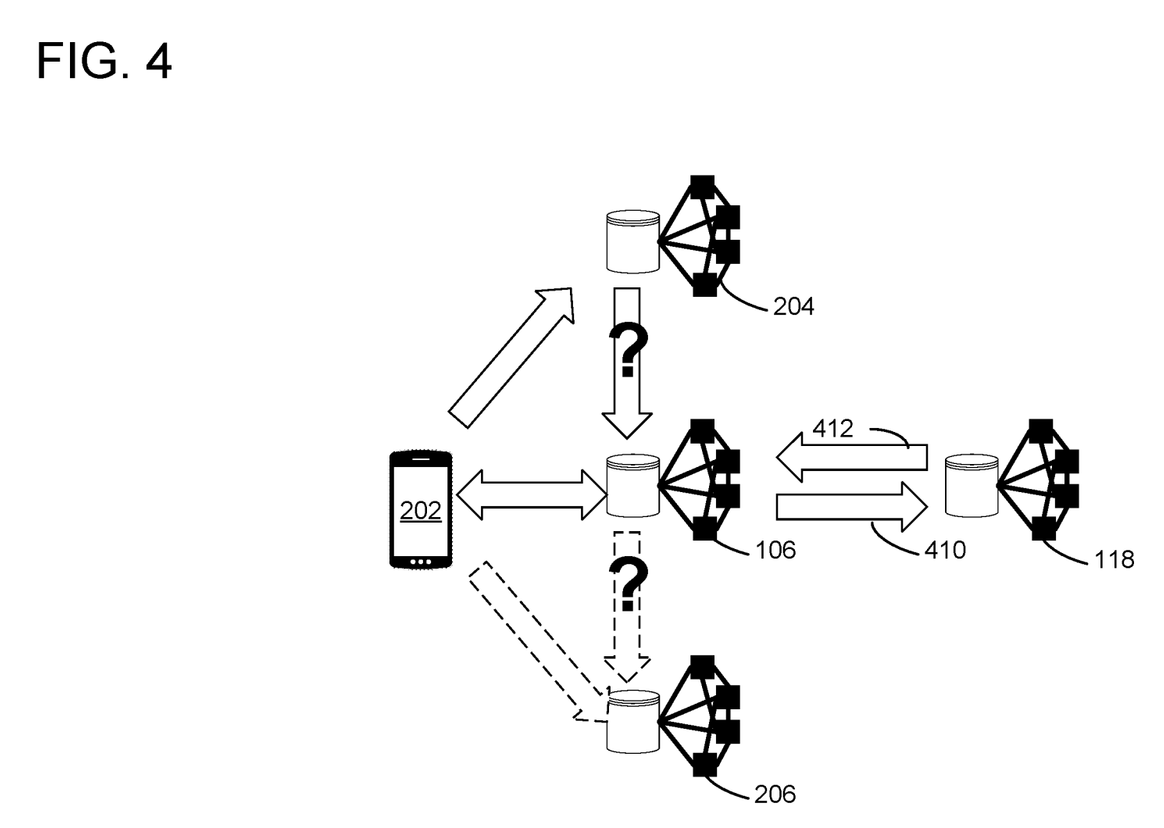
FIG. 4 illustrates a third example of an error where data packets are moving from a first network to a second network in response to a user equipment's movement or request according to some embodiments.

In a third scenario, FIG. 4 illustrates a third example of an error where data packets are moving from a network 204 to a network 206 in response to a UE 202's movement or request. In another embodiment, the switching may be in response to a network control as well, such as due to network traffic loads or other reasons. In such an example, the AMF 106 may register the UE 202 or the UE 202 may be registered on the network 204 (e.g., 5G). As such, the AMF 106 may set a "De/Reg Call Back URI" as present or active.

In moving from the network 204 to the network 206, the UDM or UECM of the network 204 may send a deregistration 412 to the AMF 106 for any of the deregistration reasons. In one embodiment, the deregistration may be communicated for the reasons mentioned previously. It is to be understood that other reasons may be created or indicated without departing from the scope of aspects of the invention.

In response to the information sent from the UDM or UECM, the AMF 106 may return an HTTP2 500 message 410, unfortunately.

Figure 5:
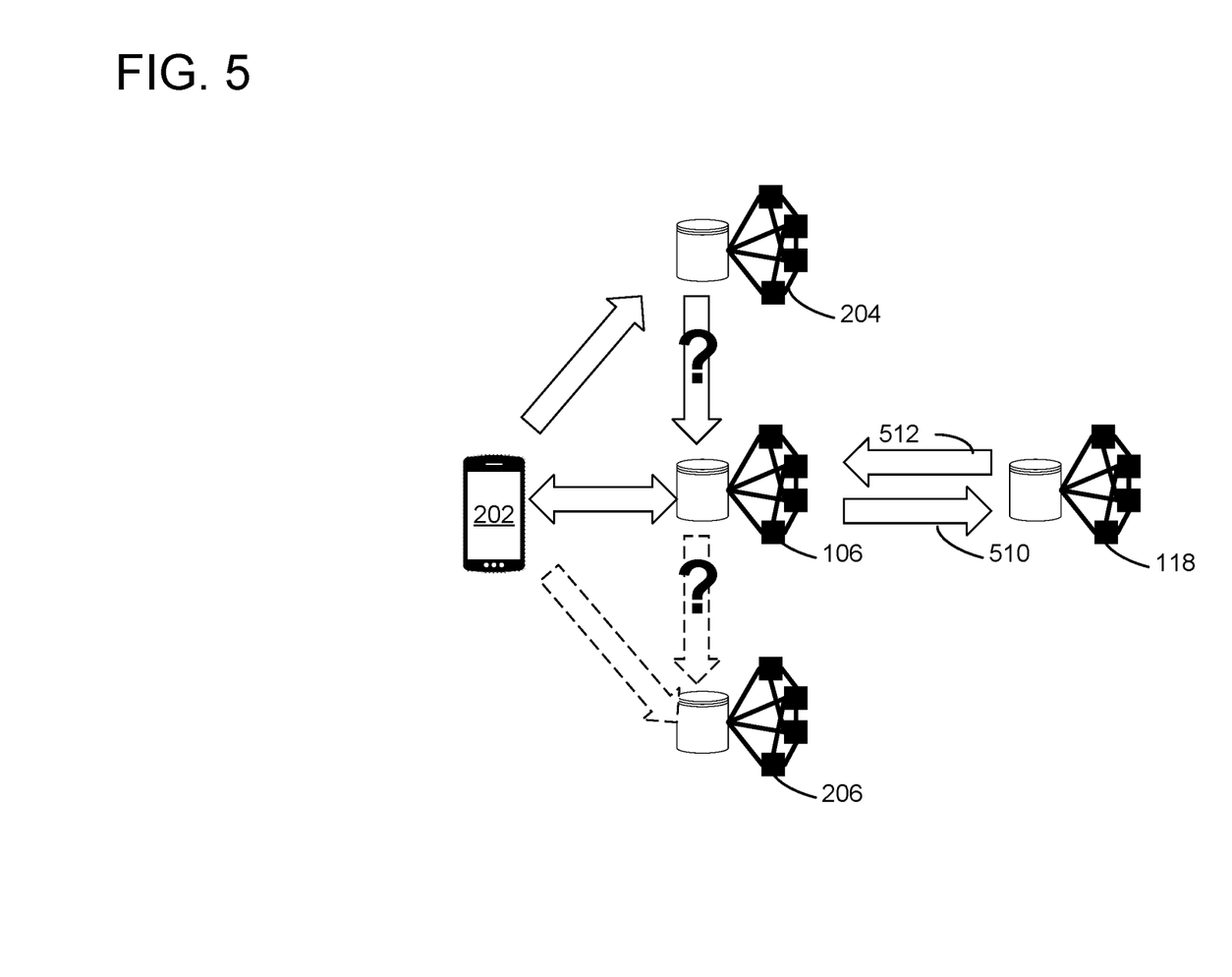
FIG. 5 illustrates a fourth example of an error where data packets are moving from a first network to a second network in response to a user equipment's movement or request according to some embodiments.

In a fourth scenario, FIG. 5 illustrates a fourth example of an error where data packets are moving from a network 204 to a network 206 in response to a UE 202's movement or request. In another embodiment, the switching may be in response to a network control as well, such as due to network traffic loads or other reasons. In such an example, the AMF 106 may register the UE 202 or the UE 202 may be registered on the network 204 (e.g., 5G). As such, the AMF 106 may set a "De/Reg Call Back URI" as present or active.

In moving from the network 204 to the network 206, the UDM or UECM of the network 204 may send a deregistration 512 to the AMF 106 for any of the deregistration reasons mentioned previously. It is to be understood that other reasons may be created or indicated without departing from the scope of aspects of the invention.

In response to the information sent from the UDM or UECM, the AMF 106 may return an HTTP2 503 message 510, unfortunately.

Figure 6:
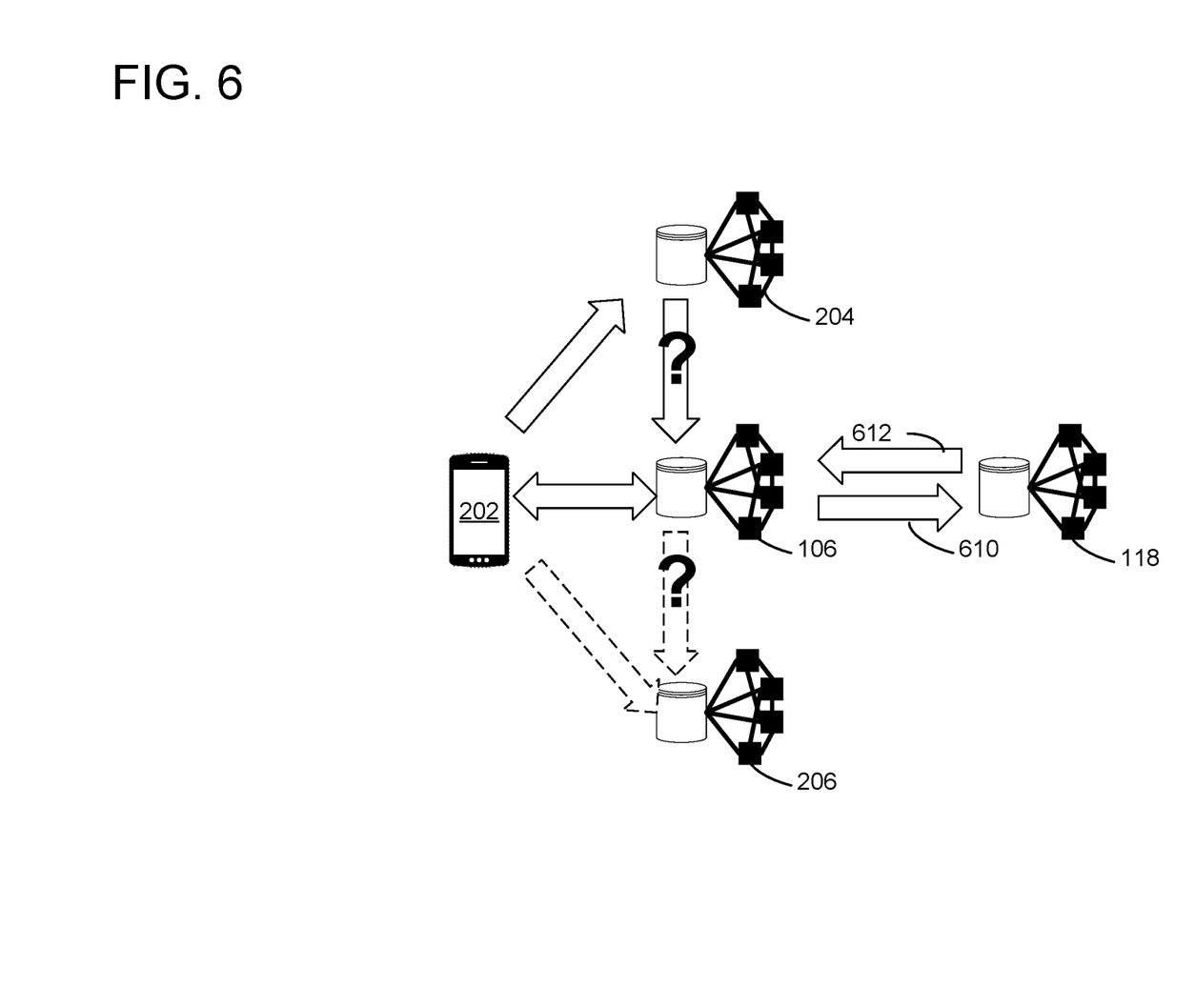
FIG. 6 illustrates a fifth example of an error where data packets are moving from a first network to a second network in response to a user equipment's movement or request according to some embodiments.

In a fifth scenario, FIG. 6 illustrates a fifth example of an error where data packets are moving from a network 204 to a network 206 in response to a UE 202's movement or request. In another embodiment, the switching may be in response to a network control as well, such as due to network traffic loads or other reasons. In such an example, the AMF 106 may register the UE 202 or the UE 202 may be registered on the network 204 (e.g., 5G). As such, the AMF 106 may set a "De/Reg Call Back URI" as present or active.

In moving from the network 204 to the network 206, the UDM or UECM of the network 204 may send a deregistration 612 to the AMF 106 for any of the deregistration reasons mentioned previously. It is to be understood that other reasons may be created or indicated without departing from the scope of aspects of the invention.

In response to the information sent from the UDM or UECM, the AMF 106 may return an HTTP2 "UNEXPECTED ERROR" message 610, unfortunately, which may include other error codes. For example, other error codes may include other client error codes 400 to 499 and other server error codes 500 to 599.

Figure 7:
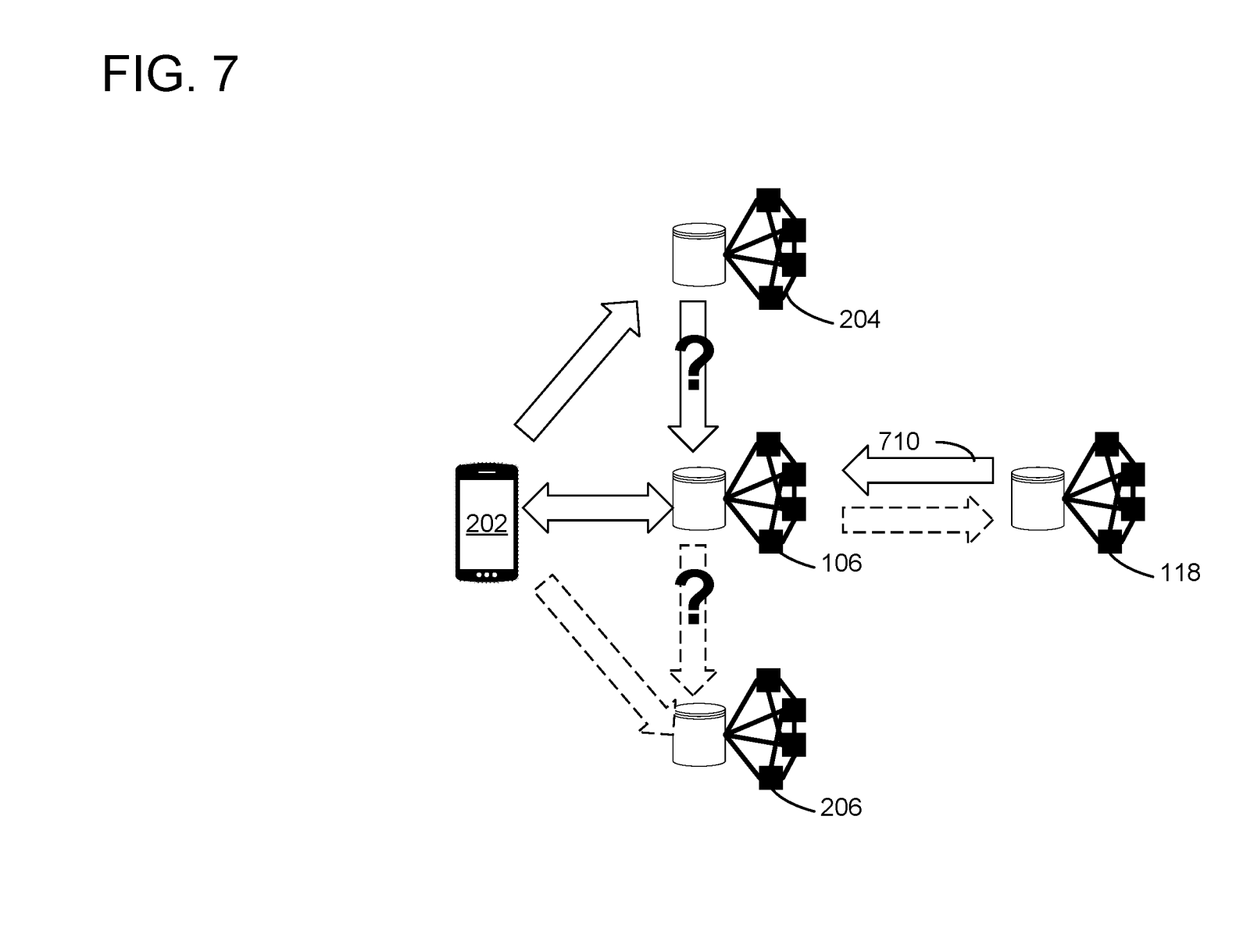
FIG. 7 illustrates a sixth example of an error where data packets are moving from a first network to a second network in response to a user equipment's movement or request according to some embodiments.

In a sixth scenario, FIG. 7 illustrates a sixth example of an error where data packets are moving from a network 204 to a network 206 in response to a UE 202's movement or request. In another embodiment, the switching may be in response to a network control as well, such as due to network traffic loads or other reasons. In such an example, the AMF 106 may register the UE 202 or the UE 202 may be registered on the network 204 (e.g., 5G). As such, the AMF 106 may set a "De/Reg Call Back URI" as present or active.

In moving from the network 204 to the network 206, the UDM or UECM of the network 204 may send a deregistration 710 to the AMF 106 for any of the deregistration reasons as mentioned previously. It is to be understood that other reasons may be created or indicated without departing from the scope of aspects of the invention.

In response to the information sent from the UDM or UECM, the AMF 106 may fail to send any error message (which is illustrated as dashed lines) unfortunately.

In other words, with these six scenarios, these error messages or the lack thereof may place the UDM in a difficult state. Because of the error messages or the lack thereof, UDM 118 is unsure whether AMF 106 has successfully taken over the handling of the data packets. As a result, the UDM 118 may need to maintain the subscriber data in the UDR in both networks 204 and 206. This prior approach results in unnecessary overhead and signaling in the networks.

Figure 8:
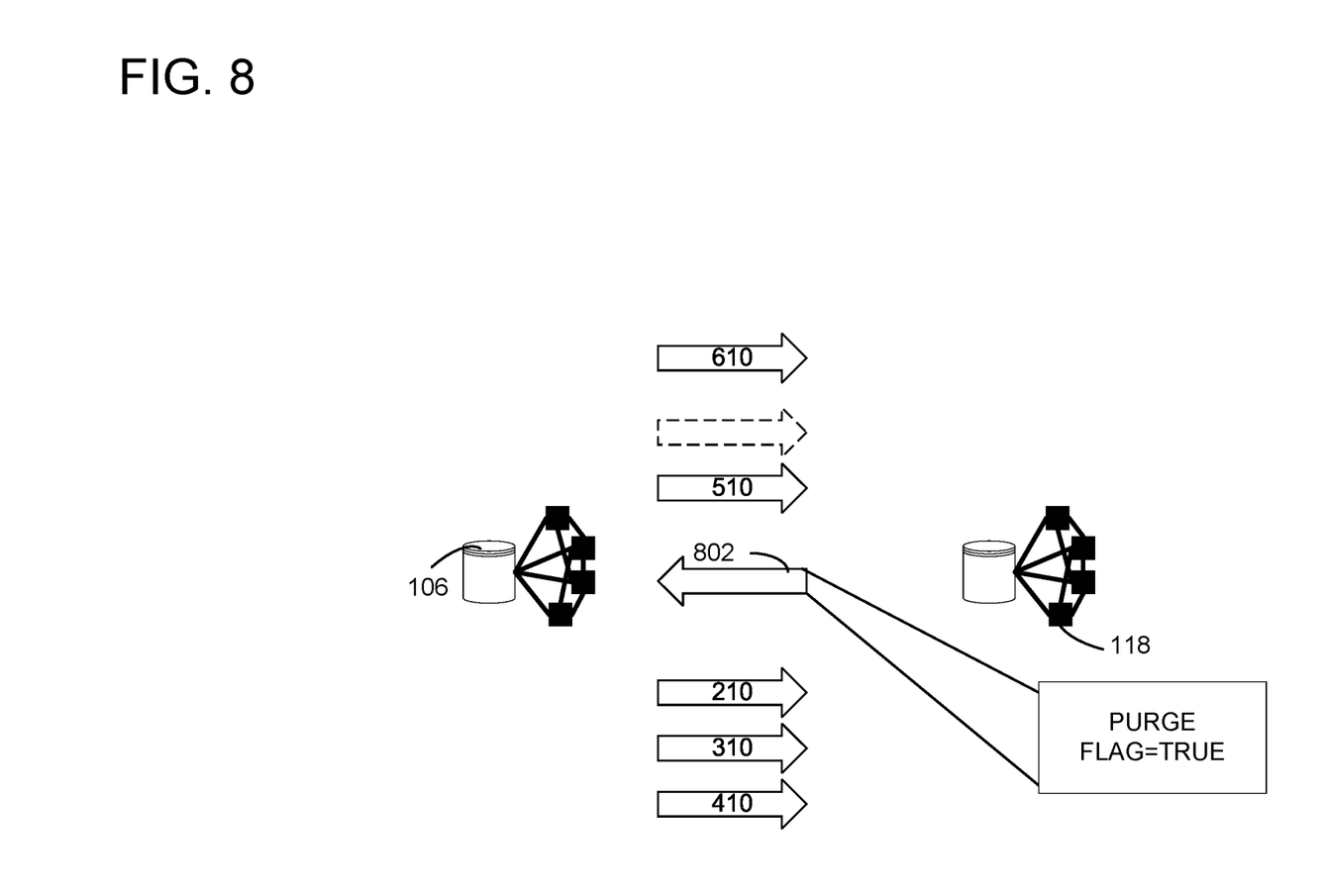
FIG. 8 illustrates a diagram showing a solution to errors according to some embodiments.

Aspects of the invention attempt to overcome such shortcomings. FIG. 8 illustrates a diagram showing a solution to errors according to some embodiments. Referring to FIG. 8, the UDM or UECM 118 may send a message 802 to the AMF 106 by setting a purge flag as "true" for the UE 202 on the UDR. In another embodiment, the UDM 118 may further delete the AMF registration information on the UDR for the UE 202.

In another embodiment, the purge flag may initially be set as false in messages 210, 310, 410, 510, or 610. In other words, the purge flag may be unset while other error messages or error codes are set by the AMF 106.

Figure 9:
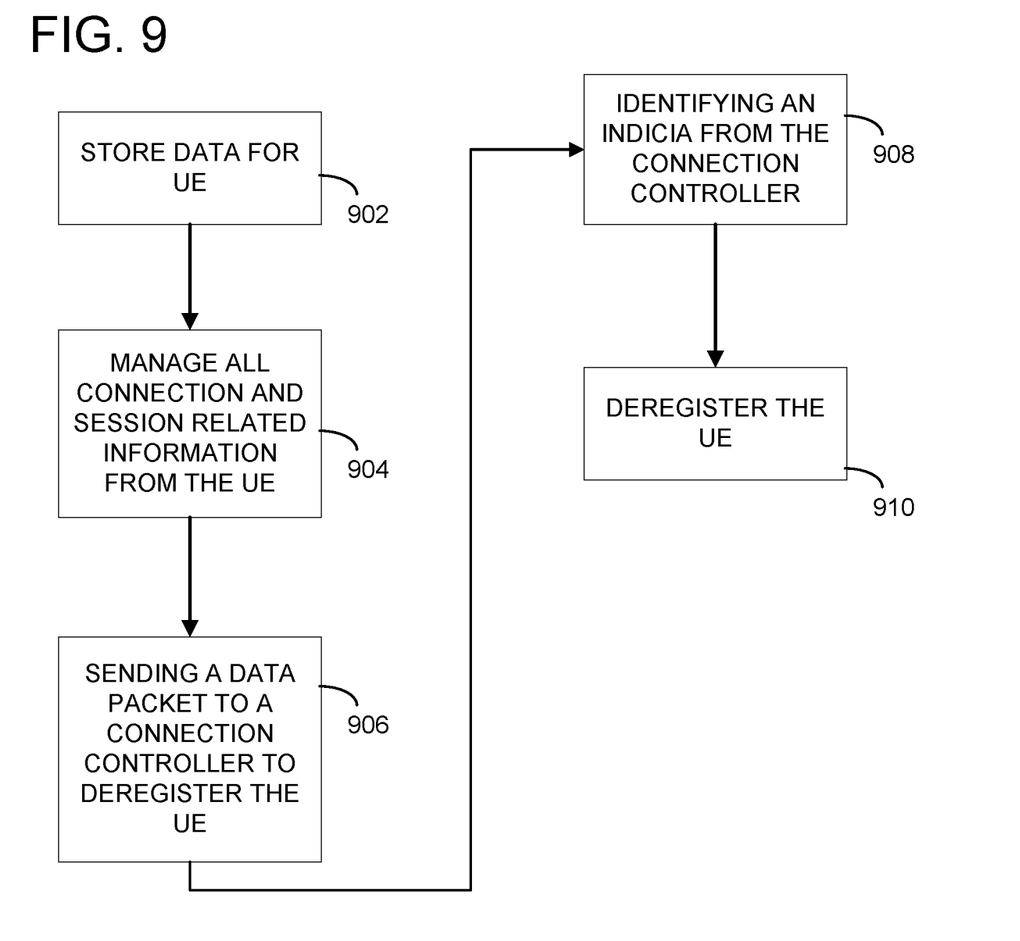
FIG. 9 is a flow chart showing a method illustrating deregistration a user equipment (UE) during a transition between a first mobile domain and a second mobile domain according to some embodiments.

FIG. 9 is a flow chart showing a method illustrating deregistration a user equipment (UE) during a transition between a first mobile domain and a second mobile domain according to some embodiments. At block 902, data may be stored for user equipment (UE). In one embodiment, the UE data may include at least one of the following: customer profile information, customer authentication information, and encryption keys for the information.

At block 904, all connection and session related information from the UE may be managed. For example, the connection and session related information may include at least one of the following: connection network, connection time, connection protocol(s), session time, session duration, session protocol(s), etc. As such, a connection controller (e.g., an AMF) may manage the connection and session related information such as storing the information, analyzing the information, updating the information, or the like. In addition, the connection controller may, based on the information, provide or trigger a response. For example, the connection controller may review or monitor the connection information and may trigger a reaction in response to a condition.

For example, upon detecting the UE is transitioned from a first mobile domain to a second mobile domain, a data packet may be communicated to a connection controller to deregister the UE at block 906.

At block 908, an indicia from the connection controller may be identified. For example, the indicia may include a receipt of an error message from the connection controller. In another embodiment, the indicia may include an expiration of a timer.

At block 910, in response to the identifying in block 908, the UE may be deregistered. In another embodiment, the method may further set a purge flag to true or to remove the connection and session related information from the UE at the connection controller.

Figure 11:
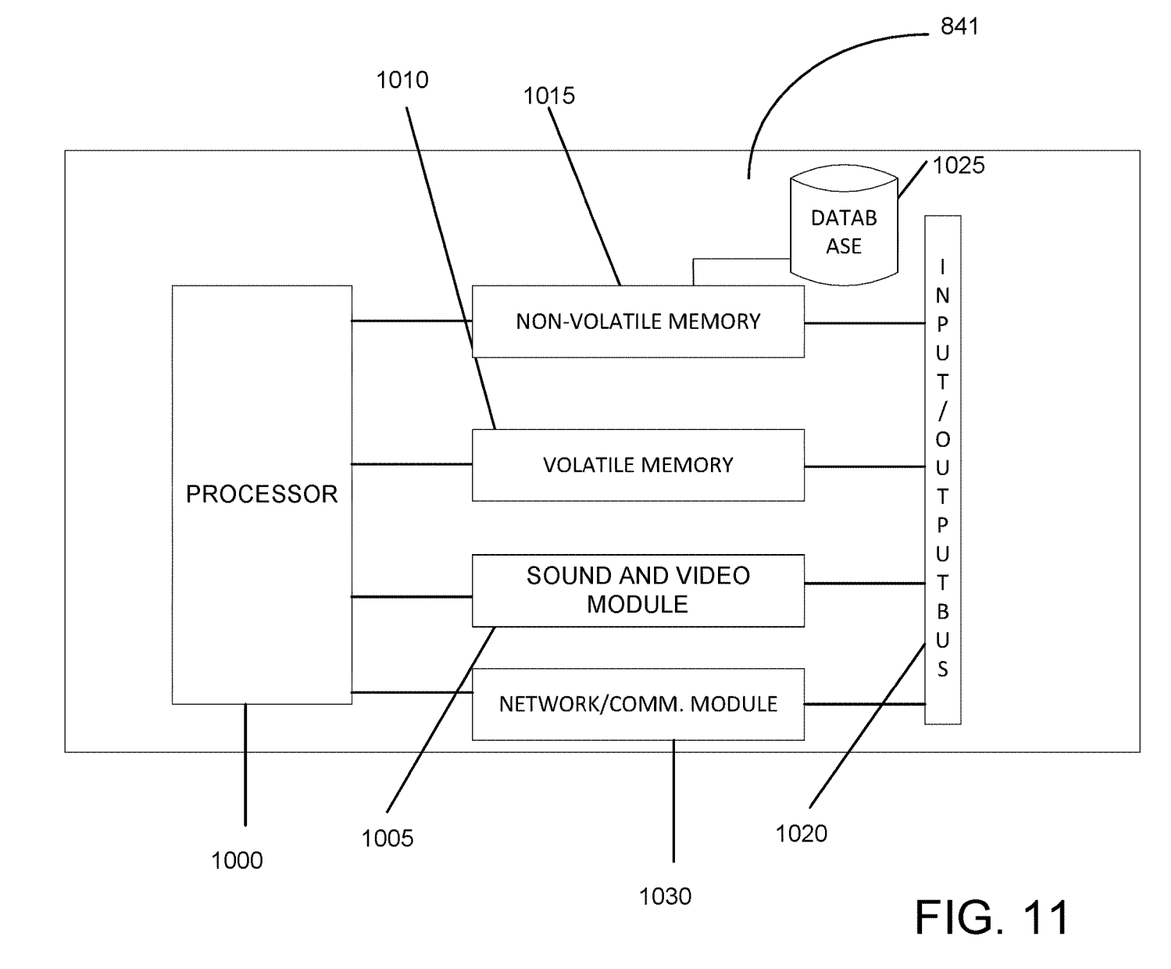
FIG. 11 is a diagram illustrating a computing device according to one embodiment.

FIG. 10 may be a high level illustration of a portable computing device 801 communicating with a remote computing device 841 in FIG. 11 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 801 may be a mobile device 108 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi® (802.11 standard), BLUETOOTH, cellular communication or near field communication devices. The communication may be direct to the computing device 841 or may be through a communication network such as cellular service, through the Internet, through a private network, through BLUETOOTH, etc., via a network or communication module 880.

FIG. 10 may be a sample portable computing device 801 that may be physically configured according to be part of the system. The portable computing device 801 may have a processor 850 that may be physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have non-volatile memory 870 and volatile memory 865. The network or communication module 880 may have GPS, BLUETOOTH, NFC, cellular or other communication capabilities. In one embodiment, some or all of the network or communication capabilities may be separate circuits or may be part of the processor 850. There also may be an input/output bus 875 that shuttles data to and from the various user input devices such as the microphone 806, the camera 808 and other inputs, such as the input pad 804, the display 802, and the speakers 810, etc. It also may control communicating with the networks, either through wireless or wired devices. Of course, this is just one embodiment of the portable computing device 801 and the number and types of portable computing devices 801 is limited only by the imagination.

The physical elements that make up the remote computing device 841 may be further illustrated in FIG. 11. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc. The input/output bus 1020 may also connect to similar devices of the microphone 806, the camera 808, the inputs such as the input pad 804, the display 802, and the speakers 810, or other peripheral devices, etc. The input/output bus 1020 also may interface with a network or communication module 1030 to control communicating with other devices or computer networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The user devices, computers and servers described herein (e.g., 801 or 841) may be computers that may have, among other elements, a microprocessor (such as from the Intel® Corporation, AMD®, ARM®, Qualcomm®, or MediaTek®); volatile and non-volatile memory; one or more mass storage devices (e.g., a hard drive); various user input devices, such as a mouse, a keyboard, or a microphone; and a video display system. The user devices, computers and servers described herein may be running on any one of many operating systems including, but not limited to WINDOWS®, UNIX®, LINUX®, MAC® OS®, iOS®, or Android®. It is contemplated, however, that any suitable operating system may be used for the present invention. The servers may be a cluster of web servers, which may each be LINUX® based and supported by a load balancer that decides which of the cluster of web servers should process a request based upon the current request-load of the available server(s).

The user devices, computers and servers described herein may communicate via networks, including the Internet, wide area network (WAN), local area network (LAN), Wi-Fi®, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of embodiments may become apparent to those skilled in the art upon review of the disclosure. The scope embodiments should, therefore, be determined not with reference to the above description, but instead should be determined with reference to the pending claims along with their full scope or equivalents.

One or more features from any embodiment may be combined with one or more features of any other embodiment without departing from the scope embodiments. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it may be understood by those of ordinary skill in the art having the present specification, figures and claims before them, that the corresponding structure includes a computer, processor, or microprocessor (as the case may be) programmed to perform the particularly recited function using functionality found in a computer after special programming and/or by implementing one or more algorithms to achieve the recited functionality as recited in the claims or steps described above. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one embodiments to the embodiments illustrated.

The present disclosure provides a solution to the long-felt need described above. In particular, aspects of the invention remove the uncertainty of signal transitions. Upon detecting the UE is transitioned from a first mobile domain to a second mobile domain, a data packet is sent to the connection controller to deregister the UE; and absent a confirmation message from the connection controller, the UE is deregistered from the first domain.

Further advantages and modifications of the above described system and method may readily occur to those skilled in the art.

The disclosure, in its broader aspects, is therefore not limited to the specific details, representative system and methods, and illustrative examples shown and described above. Various modifications and variations may be made to the above specification without departing from the scope or spirit of the present disclosure, and it is intended that the present disclosure covers all such modifications and variations provided they come within the scope of the following claims and their equivalents.

What is claimed is:

1. A system comprising:
    a processor configured for executing computer-executable instructions for deregistering a user equipment (UE) during a transition from a first mobile domain to a second mobile domain;
    a data store paired with the processor being configured for storing UE data, the UE data comprising at least one of the following: customer profile information, customer authentication information, and encryption keys for the information; and
    a connection controller being configured for managing all connection and session related information of the UE, wherein the processor is further configured to:
        upon detecting the UE is transitioned from the first mobile domain to the second mobile domain, send a data packet to the connection controller to deregister the UE from the first mobile domain, the data packet specifying a reason for deregistering the UE;
        identify an indicia from the connection controller in response to sending the data packet specifying the reason, the indicia including a lack of a confirmation of the UE deregistering from the first mobile domain; and
        in response to the identifying, deregister the UE.

2. The system of claim 1, wherein the connection controller comprises a server for an access and mobility management function (AMF).

3. The system of claim 1, wherein the indicia comprises an error message.

4. The system of claim 3, wherein the error message comprises a code according to client status error codes or server status error codes classified by hypertext transfer protocol (HTTP) response status codes.

5. The system of claim 1, wherein the indicia comprises an indication of a lack of response after a response timed-out.

6. The system of claim 1, wherein the processor is further configured to set a purge flag to true or to remove the connection and session related information from the UE at the connection controller.

7. The system of claim 1, wherein the first mobile domain comprises one or more of the following: a first mobile communication network and a first WI-FI network.

8. The system of claim 1, wherein the first mobile domain comprises one or more of the following: a second mobile communication network and a second WI-FI network.

9. The system of claim 1, wherein the connection and session related information comprises connection and session activities of the UE.

10. A computer-implemented method for deregistering a user equipment (UE) comprising:
- identifying the UE as registered with a first mobile domain;
- monitoring the UE as the UE transitions from the first mobile domain to a second mobile domain, wherein the first mobile domain is different from the second mobile domain;
- storing UE data associated with the UE, wherein the UE data comprises at least one of the following: customer profile information, customer authentication information, and encryption keys for the information;
- managing, by a connection controller, all connection and session related information of the UE;
- upon detecting the UE is transitioned from the first mobile domain to the second mobile domain, transmitting a data packet to the connection controller to deregister the UE, the data packet specifying a reason for deregistering the UE;
- identifying an indicia from the connection controller in response to sending the data packet specifying the reason, the indicia including a lack of a confirmation of the UE deregistering from the first mobile domain; and
- in response to the identifying the indicia, deregistering the UE.

11. The computer-implemented method of claim 10, wherein the connection controller comprises a server for an access and mobility management function (AMF).

12. The computer-implemented method of claim 10, wherein the indicia comprises an error message.

13. The computer-implemented method of claim 12, wherein the error message comprises a code according to client status error codes or server status error codes classified by hypertext transfer protocol (HTTP) response status codes.

14. The computer-implemented method of claim 10, wherein the indicia comprises an indication of a lack of response after a response timed-out.

15. The computer-implemented method of claim 10, further comprising setting a purge flag to true or to remove the connection and session related information from the UE at the connection controller.

* * * * *